United States Patent
Gani et al.

(10) Patent No.: US 10,489,775 B2
(45) Date of Patent: Nov. 26, 2019

(54) INTEGRATED CIRCUIT CARD ADAPTED TO TRANSFER FIRST DATA FROM A FIRST APPLICATION FOR USE BY A SECOND APPLICATION

(71) Applicant: GEMALTO SA, Meudon (FR)

(72) Inventors: Aloysius Aldo Gani, Meudon sur Seine (ID); Sylvain Lhostis, Meudon sur Seine (FR)

(73) Assignee: THALES DIS France SA, Meudon (FR)

( * ) Notice: Subject to any disclaimer, the term of this patent is extended or adjusted under 35 U.S.C. 154(b) by 0 days.

(21) Appl. No.: 15/573,627

(22) PCT Filed: May 13, 2016

(86) PCT No.: PCT/EP2016/060868
§ 371 (c)(1),
(2) Date: Nov. 13, 2017

(87) PCT Pub. No.: WO2016/180971
PCT Pub. Date: Nov. 17, 2016

(65) Prior Publication Data
US 2018/0174132 A1    Jun. 21, 2018

(30) Foreign Application Priority Data
May 13, 2015    (EP) .................................... 15305724

(51) Int. Cl.
*G06K 19/06*    (2006.01)
*G06Q 20/34*    (2012.01)
(Continued)

(52) U.S. Cl.
CPC ............. *G06Q 20/341* (2013.01); *G06F 9/54* (2013.01); *G06Q 20/40* (2013.01)

(58) Field of Classification Search
CPC ............ G06K 19/07749; G07F 7/1008; G06Q 20/341
(Continued)

(56) References Cited

U.S. PATENT DOCUMENTS 6,701,334 B1 * 3/2004 Ye ........................ G06F 9/44594
7,127,605 B1    10/2006 Montgomery
(Continued)

FOREIGN PATENT DOCUMENTS

EP    1650717 A1    4/2006
WO    WO0139427 A1    5/2001

OTHER PUBLICATIONS

Sun Microsystems et al: "Java Card (TM) 2.2 Runtime Environment (JCRE) specification", Java CardTM 2.2 Runtime Environment (JCRE) Specification, (Jun. 1, 2002), XP002325473, p. 38, paragraph 6.2.4—p. 46, paragraph 6,2,8,11.
(Continued)

*Primary Examiner* — Ahshik Kim
(74) *Attorney, Agent, or Firm* — The Jansson Firm; Pehr B. Jansson

(57) ABSTRACT

The present invention relates to an integrated circuit card comprising a rewritable non-volatile memory and a buffer, said rewritable non-volatile memory comprising a first context where a first Java Card™ application comprising first data is stored, wherein said integrated circuit card is adapted to: store in a second context of said rewritable non-volatile memory a second Java Card™ application sent by a terminal; load the first Java Card™ application first data into said buffer; extract said first Java Card™ application first data from said buffer and store said first data into said second context.

17 Claims, 6 Drawing Sheets

(51) Int. Cl.
*G06F 9/54* (2006.01)
*G06Q 20/40* (2012.01)
(58) Field of Classification Search
USPC .......................................................... 235/492
See application file for complete search history.

(56) References Cited

U.S. PATENT DOCUMENTS

2005/0184164 A1* 8/2005 de Jong ............... G06Q 20/341
 235/492
2014/0351830 A1* 11/2014 Schnellinger ........... H04W 4/60
 719/320

OTHER PUBLICATIONS

Sun Microsystems et al: "Java Card (TM) 2.2 Runtime Environment (JCRE) specification", Java CardTM 2.2 Runtime Environment (JCRE) Specification, XX,XX, (Jun. 1, 2002), page complete, XP002325473, p. 38, paragraph 6.2.4—p. 46, paragraph 6,2,8,11.
PCT/EP2016/060868,International Search Report, dated Jul. 22, 2016, European Patent Office, P.B. 5818 Patentlaan 2 NL—2280 HV Rijswijk.
PCT/EP2016/060868,Written Opinion of the International Searching Authority, dated Jul. 22, 2016, European Patent Office, P.B. 5818 Patentlaan 2 NL—2280 HV Rijswijk—Pays Bas.

* cited by examiner

INTEGRATED CIRCUIT CARD ADAPTED TO TRANSFER FIRST DATA FROM A FIRST APPLICATION FOR USE BY A SECOND APPLICATION

TECHNICAL FIELD

The present invention relates to an integrated circuit card comprising a rewritable non-volatile memory and a buffer, said rewritable non-volatile memory comprising a first context where a first JavaCard™ application comprising first data is stored.

The invention also relates to an associated method.

BACKGROUND OF THE INVENTION

When a first JavaCard™ application has already been deployed in an integrated circuit card and updates are needed (for example for a bug fix or a new feature), these updates are costly and not straight forward, especially due to first data existing inside the application. These first data are sometimes confidential and personalized by the customer itself. A solution to fix the bug or to add a new feature is a re-installation of the JavaCard™ application with the corrected feature or new feature.

A problem of this prior art is that when re-installing said JavaCard™ application with the corrected features or new features, all first data will be lost. Face to this update issue for application with sensitive data a re-issuance of the card with the updated application is made, which is costly.

SUMMARY OF THE INVENTION

It is an object of the invention to provide an integrated circuit card comprising a rewritable non-volatile memory and a buffer, said rewritable non-volatile memory comprising a first context where a first JavaCard™ application comprising first data is stored, which permits to securely transfer these first data to a second JavaCard™ application to smoothen the update process, said second JavaCard™ application comprising the corrected feature or the new feature to add.

To this end, there is provided an integrated circuit card comprising a rewritable non-volatile memory and a buffer, said rewritable non-volatile memory comprising a first context where a first JavaCard™ application comprising first data is stored, wherein said integrated circuit card is adapted to:
  store in a second context of said rewritable non-volatile memory a second JavaCard™ application sent by a terminal;
  load the first JavaCard™ application first data into said buffer;
  extract said first JavaCard™ application first data from said buffer and store said first data into said second context.

As we will see in further details, the buffer may be used as a common buffer between the first JavaCard™ application and the second JavaCard™ application. Thus, transfer of first data is possible between two JavaCard™ applications which are in totally different contexts and which usually may not communicate together.

According to non-limitative embodiments of the invention, the integrated circuit card in accordance with the invention further comprises the following characteristics.

In a non-limitative embodiment, said integrated circuit card is further adapted to:
  receive at least one APDU command from said terminal to trigger said loading, said extraction, and said storing of the first data in said second context;
  send to said terminal a first APDU response indicating that said at least one APDU command has been executed correctly.

In a non-limitative embodiment, said integrated circuit card is further adapted to:
  select the second JavaCard™ application as the running application; and
  delete said first JavaCard™ application from said rewritable non-volatile memory.

In a non-limitative embodiment, said integrated circuit card is further adapted to execute a mutual authentication between said first JavaCard™ application and said second JavaCard™ application.

In a non-limitative embodiment, said integrated circuit card is further adapted to store in said second context and in said first context a secret key or a pair of private and public keys for the mutual authentication.

In a non-limitative embodiment, said rewritable non-volatile memory further comprises a shareable interface which is imported within said first JavaCard™ application and within said second JavaCard™ application, said shareable interface defining at least one shared method for said loading.

In a non-limitative embodiment, said shareable interface defines at least one shared method for said mutual authentication.

In a non-limitative embodiment, the first JavaCard™ application implements the at least one shared method for said loading, and the second JavaCard™ application implements at least one method for said extraction and for said storing of said first data into said buffer.

In a non-limitative embodiment, the first JavaCard™ application further implements the at least one shared method for said mutual authentication.

In another non-limitative embodiment, said rewritable non-volatile memory further comprises:
  a third JavaCard™ application;
  a first shareable interface which is defined within said first JavaCard™ application and which is imported within said third JavaCard™ application, said first shareable interface comprising the declaration of at least one first shared method for said loading;
  a second shareable interface which is defined within said second JavaCard™ application and which is imported within said third JavaCard™ application, said second shareable interface comprising the declaration of at least one second shared method for said loading.

In a non-limitative embodiment, said first shareable interface comprises the declaration of at least one first shared method for said mutual authentication, and said second shareable interface comprises the declaration of at least one second shared method for said mutual authentication.

In a non-limitative embodiment, the first JavaCard™ application implements the at least one first shared method for said loading, and the second JavaCard™ application implements at least one method for said extraction and for said storing of said first data into said buffer.

In a non-limitative embodiment, said integrated circuit card is a secure element.

In a non-limitative embodiment, said integrated circuit card is further adapted to store in said second context with the second JavaCard™ application, a first application identification associated to said first JavaCard™ application.

In addition, there is provided a method for transferring first data of a first JavaCard™ application within an integrated circuit card for use by a second JavaCard™ application within said integrated circuit card, said integrated circuit card comprising a rewritable non-volatile memory and a buffer, said first JavaCard™ application being stored in a first context in said rewritable non-volatile memory, wherein said method comprising:

storing a second JavaCard™ application sent by a terminal in a second context of said rewritable non-volatile memory;
loading the first JavaCard™ application first data into said buffer;
extracting said first JavaCard™ application first data from said buffer and storing said first data into said second context.

In a non-limitative embodiment, said method further comprises:

selecting the second JavaCard™ application as the running application; and
deleting said first JavaCard™ application from said rewritable non-volatile memory.

In a non-limitative embodiment, said method further comprises executing a mutual authentication between said first JavaCard™ application and said second JavaCard™ application.

In a non-limitative embodiment, said method further comprises storing in said second context and in said first context a secret key or a pair of private and public keys for the mutual authentication.

In a non-limitative embodiment, for said loading at least one shared method is defined within a shareable interface which is imported within said first JavaCard™ application and within said second JavaCard™ application.

In another non-limitative embodiment, for said loading:

at least one first shared method is defined within a first shareable interface, said first shareable interface being defined within said first JavaCard™ application and being imported within said third JavaCard™ application;
at least one second shared method is defined within a second shareable interface, said second shareable interface being defined within said second JavaCard™ application and being imported within said third JavaCard™ application.

In a non-limitative embodiment, said method further comprises storing in said second context with the second JavaCard™ application, a first application identification associated to said first JavaCard™ application.

In addition, there is provided a computer program product comprising a set of instructions, which when loaded into an integrated circuit card, causes the integrated circuit card to carry out the method according to any one of the previous characteristics.

BRIEF DESCRIPTION OF THE FIGURES

Some embodiments of methods and/or apparatus in accordance with embodiments of the present invention are now described, by way of example only, and with reference to the accompanying drawings, in which.

DESCRIPTION OF EMBODIMENTS OF THE INVENTION

In the following description, well-known functions or constructions by the man skilled in the art are not described in detail since they would obscure the invention in unnecessary detail.

Figure 1:
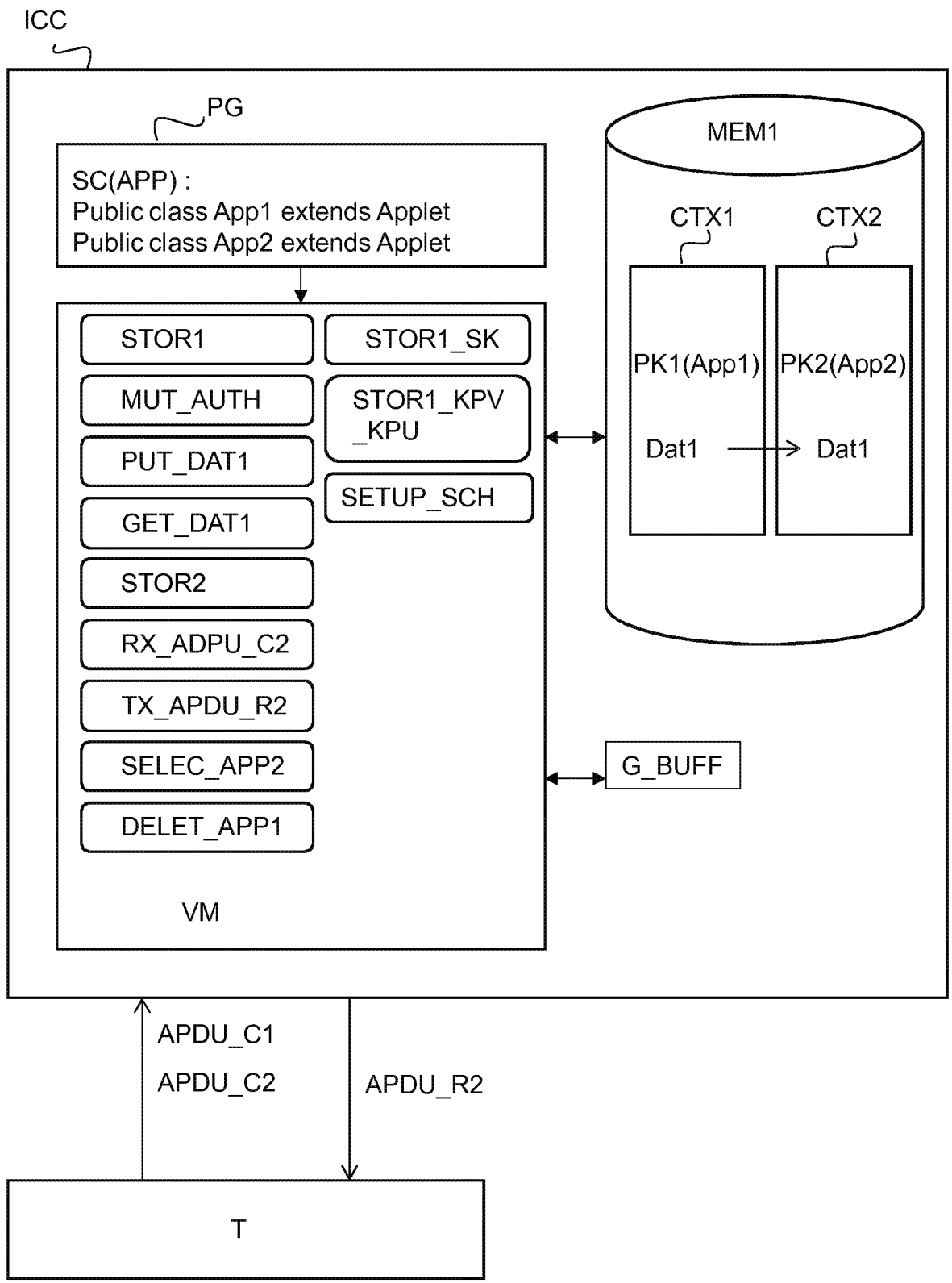
FIG. 1 illustrates schematically an integrated circuit card according to a non-limitative embodiment of the invention.

The present invention relates to an integrated circuit card ICC illustrated in FIG. 1.

Said integrated circuit card ICC comprises a rewritable non-volatile memory MEM1, a buffer G_BUFF, and a virtual machine VM.

In the following description, the integrated circuit card ICC is also called ICC card.

In the following description:

application refers to a set of one or more programs designed to carry out a set of operations sequences to perform specific tasks. An application APP comprises at least one applet;
platform refers to the integrated circuit card ICC comprising at least an operating system and a virtual machine.
applet refers to a program which is written in a source code and delivered to users in the form of virtual machine instructions. An applet can be loaded in the integrated circuit card ICC after it has been manufactured, during the lifetime of said integrated circuit card ICC. An applet comprises at least one platform-independent method;
source code refers to programming code that is a platform-independent code. The source code is interoperable as it may be run without being modified on any kind of devices such as an integrated circuit card ICC which supports a virtual machine VM. It is written in a portable language and run by a virtual machine. Once compiled, the source code generates virtual machine instructions;
a virtual machine VM is an interpreter which decodes and executes virtual machine instructions;
virtual machine instructions refers to programming code that is run through a virtual machine instead of a specific unit processor, such as a unit processor of the integrated circuit card ICC. Such programming code is a platform-independent code. Said virtual machine instructions are issued from the compilation of source code;
an operations sequence (also called function) comprises one or a plurality of operations;
an instruction refers to a code instruction;
APDU refers to application protocol units. An APDU permits the integrated circuit card ICC to communicate with a terminal T. An APDU contains either a command referred as APDU_C or a response message referred as APDU_R;

a package PK permits to group JavaCard™ classes or interfaces together, which are all related. Moreover, packages may be stored in structured containers (called cap files or .ijc files in the example of JavaCard™ packages), allowing to download the classes or interfaces as a functionally consistent group;

the applet firewall referred to a mechanism which confines an application to its own designated area. Hence, an application is prevented from accessing the contents or behaviors of objects owned by other applications;

a context CTX is a protected area which is assigned to all the applications of a single package PK. Object access between applications in the same context is allowed. Accessing by an application of a context to an object in a different context is denied by the applet firewall. Hence, different packages means that there are different contexts CTX;

a terminal T is any kind of device, computer or reader which is adapted to communicate with the integrated circuit card ICC through APDU commands, either in contact of contactless mode.

In non-limitative examples:

the virtual machine VM is a JavaCard™ virtual machine JVM and the portable language is the JavaCard™ language dedicated to an integrated circuit card ICC card, which is called JavaCard™.

the source code of an application is written in JavaCard™. The virtual machine instructions are of the form of bytecodes. They include one or a plurality of bytes. The bytecodes are stored in a file called cap file.

These non-limitative examples will be taken in the following description.

The integrated circuit card ICC may be contact or contactless.

In a non-limitative embodiment, the integrated circuit card ICC is a secure element.

A secure element is a secured component which comprises a secured chip and may perform cryptographic functionalities and is adapted to store secret information.

In non-limitative variants, the secure element is a smart card, a soldered element, an M2M module, an eSE (embedded secure element), a micro-SD etc. In non-limitative examples, the secure element is a banking card, such as an EMV card, an Electronic Identity Card, a health card, a driving license, a passport, a privacy card, a financial service card, an access card etc.

As illustrated in FIG. 1, the ICC card comprises:
a virtual machine VM;
a rewritable non-volatile memory MEM1, said rewritable non-volatile memory MEM1 comprising a first context CTX1 where a first JavaCard™ application App1 comprising first data Dat1 is stored;
a buffer G_BUFF.

"first data" means the data of the first JavaCard™ application App1. These first data may be updated or not during the lifetime of said first JavaCard™ application App1.

The buffer G_BUFF is in volatile memory.

In a first non-limitative embodiment, said buffer G_BUFF is an APDU buffer dedicated to APDU commands APDU_C. This APDU buffer stores the APDU commands. Such APDU buffer being well-known by the man skilled in this art, it won't be described here.

In a second non-limitative embodiment, said buffer G_BUFF is a temporary global array. It is a transient buffer.

Said temporary global array doesn't store any APDU command, but it is created during a process of an APDU command and is automatically cleared and deleted after the processing of the APDU command is finished. Such temporary global array being well-known by the man skilled in this art, it won't be described here.

In a non-limitative embodiment, the rewritable non-volatile memory MEM1 is a memory such as an EEPROM ("Electrically-Erasable Programmable Read-Only Memory»), a FLASH memory, etc.

The ICC card comprises one or a plurality of JavaCard™ applications (in particular App1) The bytecodes corresponding to the source code SC of said JavaCard™ applications are stored in the first memory MEM1.

Application developers are facing more and more challenges as during the whole life of the application, they have to make a first JavaCard™ application easily customizable to meet fast changing market demands. Furthermore, application developers need sometimes to fix some bugs in a first JavaCard™ application App1.

Hence, in order to update a first JavaCard™ application App1 to add new features, modify some features or make some corrections, it is necessary to collect the necessary first data Dat1 of the first JavaCard™ application App1 for use by a second JavaCard™ application App2 which will replace the first JavaCard™ application App1 (otherwise, said first data Dat1 will be lost). In the following description, the first JavaCard™ application App1 will also be called indifferently first application App1 or old application App1, and the second JavaCard™ application App2 will also be called indifferently second application App2 or new application App2.

Such first data Dat1 are in non-limitative examples sensitive data such as:
user data such as fingerprints, identity data;
private cryptographic keys;
electronic money etc.

Because of the applet firewall, the first data Dat1 used by the first JavaCard™ Application App1 and stored in a first context CTX1 may not be accessed by any other application which is not in said first context CTX1. Therefore, when a new application App2 is needed to replace the old application App1, the ICC card is adapted to:
store in a second context CTX2 of said rewritable non-volatile memory MEM1 a second JavaCard™ Application App2 sent by a terminal T (function illustrated in FIG. 1 STOR1);
the second JavaCard™ application (App2) being adapted to receive at least one APDU command (APDU_C2) from said terminal (T) to trigger the following steps through the Integrated circuit card (ICC):
load the first JavaCard™ Application App1 first data Dat1 into said buffer G_BUFF (function illustrated in FIG. 1 PUT_DAT1);
extract said first JavaCard™ Application App1 first data Dat1 from said buffer G_BUFF (function illustrated in FIG. 1 GET_DAT1); and
store said first data Dat1 into said second context CTX2 of said rewritable non-volatile memory MEM1 (function illustrated in FIG. 1 STOR2).

In a non-limitative embodiment, said functions are performed by means of the virtual machine VM of the integrated circuit card ICC.

In a non-limitative embodiment, the virtual machine VM is further adapted to perform the further non-limitative functions described hereinafter.

It is to be noted that said second context CTX2 and said first context CTX1 are different. Since the second JavaCard™ application App2 is a new application, it will be installed after the old application App1. Hence, it will be stored in a different context than the first application's context.

It is to be noted that the buffer G_BUFF is used as a common buffer by both first and second application App1, App2 to exchange data as said buffer is accessible by all the applications of the ICC card at the same time, regardless of the context CTX.

It is to be noted that said second application App2 is comprised in a second package PK2 different from a first package PK1 of the first application App1.

As the ICC card uses the APDU protocol to communicate with the terminal T, in a non-limitative embodiment, said ICC card is further adapted to:
  receive at least one APDU command APDU_C2 from said terminal T (function illustrated in FIG. 1 RX_APDU_C2) to trigger said loading PUT_DAT1, said extraction GET_DAT1 and said storing STOR2 of the first data Dat1 in said second context CTX2;
  send to said terminal T a first APDU response APDU_R2 (function illustrated in FIG. 1 TX_APDU_R2) indicating that the at least one APDU command APDU_C2 has been executed correctly.

If the APDU command APDU_C2 has been executed correctly, it means that the first data Dat1 have been recovered for use by the second application App2.

Hence, the second application App2 may become the current application to be run in the ICC card and the first application App1 is no longer needed. Therefore, in a non-limitative embodiment, said ICC card is further adapted to select the second application App2 as the running application (function illustrated in FIG. 1 SELEC_APP2); and delete said first application App1 from said rewritable non-volatile memory MEM1 (function illustrated in FIG. 1 DELET_APP1).

In a non-limitative embodiment, said ICC card is further adapted to store in said second context CTX2 with the second application App2, a first identification AID1 associated to said first application App1.

It permits the ICC card to chose which first application App1 is to be replaced by the second application App2;

In a non-limitative embodiment, said ICC card is further adapted to execute a mutual authentication between said first JavaCard™ Application App1 and said JavaCard™ second application App2 (function illustrated in FIG. 1 MUT_AUTH).

The mutual authentication ensures that the old application App1 and the new application App2 are genuine. Moreover, in a non-limitative embodiment, the mutual authentication generates the session keys which will be used to encipher the sensitive data during the transfer of data. These session keys are used between the old application App1 and the new application App2.

It is to be noted that when the mutual authentication is applied, said APDU command APDU_C2 also triggers said mutual authentication MUT_AUTH. In a non-limitative embodiment, said ICC card is further adapted to store in said second context CTX2, a secret key Sk for the mutual authentication MUT_AUTH (function illustrated in FIG. 1 STOR1_SK)), or a pair of private and public keys Kpv, Kpu for the mutual authentication MUT_AUTH (function illustrated in FIG. 1 STOR1_KPV_KPU)).

It permits the ICC card to perform the mutual authentication between both applications App1, App2 using a symmetric authentication process by means of the shared secret key Sk, or an asymmetric authentication process by means of the pair of keys Kpu, Kpv.

Therefore, all the existing data inside the old application App1 may be transferred securely to the new application App2. The sharing of the first data Dat1 of the first application App1 through the buffer G_BUFF is secured.

In a non-limitative embodiment, these keys Sk, or Kpv-Kpu are loaded during the personalization phase PH for the first application App1 and as a parameter during the storing of the second application App2 into said ICC card. In another non-limitative embodiment, these keys Sk, or Kpv-Kpu are stored in a non-volatile manner inside the first application App1 and inside the second application App2.

In a non-limitative variant of embodiment, the mutual authentication is performed by means of a challenge-response authentication:

The first application App1 generates and sends a challenge to the second application App2. Said second application App2 encrypts this challenge with the secret key (in the case of the symmetric process) and sends back the cryptogram obtained. Said first application App1 verifies said cryptogram with the secret key. As this authentication is well-known by the man skilled in the art, it won't be described in more details here.

In order for the ICC card and the terminal T to securely communicate together, in a non-limitative embodiment, said ICC card is further adapted to establish a secure channel SCh with said terminal T (function illustrated in FIG. 1 SETUP_SCH) and to receive APDU commands APDU_C from said terminal T and send back associated responses APDU_R within said secured channel SCh.

The establishment of a secure channel SCh permits some session keys to be generated. These session keys will be used between the ICC card and the terminal T. They are different from those used between the new and old applications App1 App2. Then next exchanges of information between the ICC card and the terminal T are performed within said secured channel: these session keys will be used to:
  cipher the information (of the JavaCard™ applications App1, App2, the first data Dat1 etc.) which are exchanged between the ICC card and the terminal T;
  or to computes a MAC (Message Authentication Code) associated to the information exchanges for integrity checking.

Therefore, the transmission of APDU commands APDU_C and APDU responses APDU_R between the ICC card and the terminal T may be securely performed. Hence, the loading of the second application App2 may be securely performed.

In a non-limitative variant of embodiment, the secure channel SCh is set-up by means of a Global Platform secure channel protocol (which is well-known by the man skilled in the art) between the ICC card and the terminal T. Such a GAP procedure being well-known by the man skilled in the art, it won't be described here.

In order to perform all the functions above-described, two non-limitative embodiments of the ICC card may be used. These two embodiments are respectively illustrated in FIG. 2 and FIG. 3 and are described hereinafter.

In a non-limitative embodiment, the virtual machine VM is further adapted to perform the further non-limitative functions described hereinafter in the first non-limitative embodiment, and in the second non-limitative embodiment.

First Non-Limitative Embodiment

Figure 2:
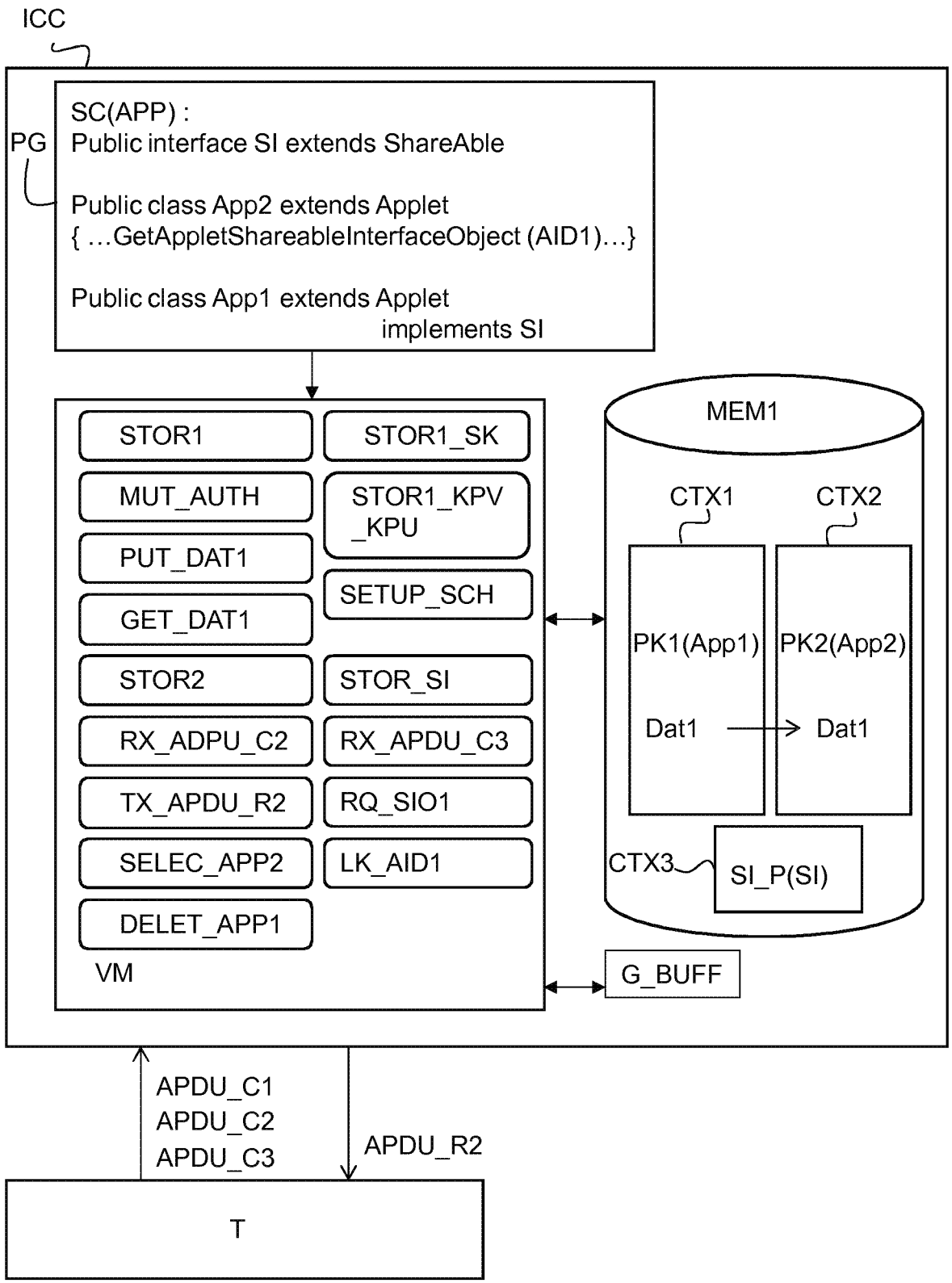
FIG. 2 illustrates schematically the integrated circuit card of FIG. 1 according to a first non-limitative variant of embodiment.

The first non-limitative embodiment of the ICC card referred to FIG. 2.

As will be described hereinafter, in this first non-limitative embodiment, the second application App2 is acting as a client, and the first application App1 is acting as a server.

The client App2 will call the shared method(s) MTH1 of the server App1 to perform the mutual authentication MUT_AUTH (when said mutual authentication is applied) and the loading PUT_DAT1.

According to this first embodiment, the rewritable non-volatile memory MEM1 of the ICC card further comprises a shareable interface SI which is imported within said first application App1 and within said second application App2, said shareable interface SI defining at least one first shared method MTH1 for:
- the mutual authentication MUT_AUTH (when said mutual authentication is applied);
- the loading PUT_DAT1.

Said at least one first shared method MTH1 is therefore available for and accessible by the second application App2.

It is to be noted that:
- one method MTH1 may be declared for both operations sequences MUT_AUTH, PUT_DAT1; or
- two methods MTH1 may be declared, one for each operation sequence; or
- a plurality of methods MTH1 may be declared for one operation sequence.

In a non-limitative embodiment, said ICC card is further adapted to store in a third context CTX3 of said rewritable non-volatile memory MEM1 said shareable interface SI (function illustrated in FIG. 2 STOR_SI).

It is to be noted that said third context CTX3 is different from said first context CTX1 and from said second context CTX2.

Indeed, as the first application App1 imports said shareable interface SI, it is not possible to store said shareable interface SI in the second context CTX2. Moreover, if the shareable interface SI is stored in the first context CTX1, the first application App1 can't be deleted after the update.

It is to be noted that said shareable interface SI is comprised in a package for the storing SI_P.

In a non-limitative embodiment, the storing of said shareable interface SI is performed upon reception of a second APDU loading command APDU_C3 comprising a package SI_P with said shareable interface SI and sent by a terminal T (function illustrated in FIG. 2 RX_APDU_C3).

It is to be noted that if the first application App1 has been stored during a personalization phase PH, the shareable interface SI is to be stored beforehand, during said personalization phase PH.

In any case, the shareable interface package SI_P is to be loaded before the first application package PK1, importing the shared interface definition from said shareable interface package SI_P. Of course, the second application package PK2 is loaded after said first application package PK1.

In a non-limitative embodiment, the first application App1 implements the at least one first shared method MTH1 for said mutual authentication MUT_AUTH (when applied) and for said loading PUT_DAT1, whereas the second application App2 implements at least one method MTH2 for the extraction GET_DAT1 of said first data Dat1 from said buffer G_BUFF and for the storing STOR2 of said first data Dat1 into the second context CTX2 of said rewritable non-volatile memory MEM1.

It is to be noted that the at least one method MTH2 is not a shared method. It is an unshared method.

In order to call the at least one first shared method MTH1 for the mutual authentication MUT_AUT (when applied) and for the loading PUT_DAT1 of the first application App1, in a non-limitative embodiment, the ICC card is adapted to request a first shareable interface object SIO1 related to said first application App1 (function illustrated in FIG. 2 RQ_SIO1).

In a non-limitative embodiment, the request is performed via the getShareableInterfaceObject method which is available in the JavaCard™. Hence, the second application App2 will be able to get the first object SIO1 which implements the first shared method(s) MTH1, by using the getShareableInterfaceObject method.

In a non-limitative embodiment, the request is performed upon receiving the at least one APDU command APDU_C2 above-described.

It is to be noted that before requesting an SIO1 from the first application App1, the ICC card is adapted to obtain the AID object associated to the first application App1, which is the first application identification AID1 stored in the second context CTX2 above described (function illustrated in FIG. 2 LK_AID1).

This AID1 will be a parameter of the getShareableInterfaceObject method so that the second application App2 will be able to get the first shared methods MTH1 of the right first application App1.

Then, the second application App2 calls the first shared method MTH1 implemented in the first application App1, i.e. the SIO1.MTH1.

Second Non-Limitative Embodiment

Figure 3:
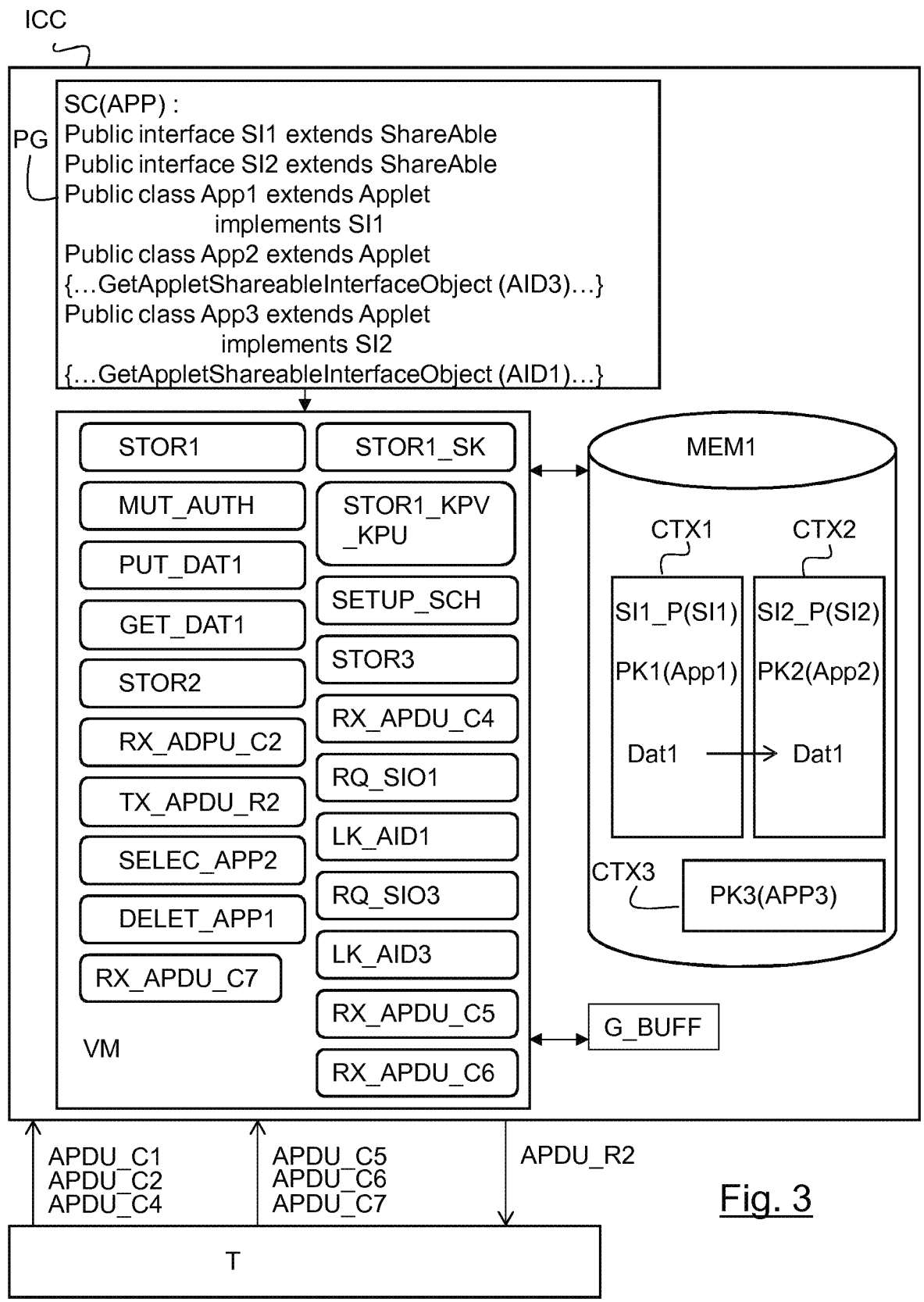
FIG. 3 illustrates schematically the integrated circuit card of FIG. 1 according to a second non-limitative variant of embodiment.

The second non-limitative embodiment of the ICC card referred to FIG. 3.

As will be described hereinafter, in this second non-limitative embodiment, the second application App2 is acting as a client, and the third application App3 is acting as a server.

The client App2 will call the shared method(s) MTH3 of the server App3.

And, the third application App3 is acting as a client, and the first application App1 is acting as a server.

The client App3 will call the shared method(s) MTH4 of the server App1.

Hence, the third application App3 is acting as an intermediary application which passes the message from the new application App2 to the old application App1 to perform the mutual authentication MUT_AUTH (when said mutual authentication is applied) and the loading PUT_DAT1.

According to this second embodiment, the rewritable non-volatile memory MEM1 of the ICC card further comprises:
- a third JavaCard™ application App3;
- a first shareable interface SI1 which is defined within said first JavaCard™ application App1 and which is imported within said third JavaCard™ application App3, said first shareable interface SI1 comprising the declaration of at least one first shared method MTH1 for the loading PUT_DAT1;
- a second shareable interface SI2 which is defined within said second JavaCard™ application App2 and which is imported within said third JavaCard™ application App3, said second shareable interface package SI2 comprising the declaration of at least one second shared method MTH3 for the loading PUT_DAT1.

Therefore, the first shareable interface SI1 is implemented by said first JavaCard™ application App1, and the second shareable interface SI2 is implemented by said third JavaCard™ application App3.

In a non-limitative embodiment, when the mutual authentication MUT_AUTH is applied, the first shareable interface SI1 further defines at least one first shared method MTH1 for said mutual authentication MUT_AUTH, and the second shareable interface package SI2 further defines at least one second shared method MTH3 for said mutual authentication MUT_AUTH. "Defines at least one shared method" means that a shareable interface SI1, SI2 comprises the declaration of at least one shared method.

In the following description, the third JavaCard™ application App3 will also be called indifferently third application App3 or intermediary application App3.

Said at least one first shared method MTH1 is therefore available for and accessible by the intermediary application App3.

Said at least one second shared method MTH3 is therefore available for and accessible by the new application App2.

It is to be noted that:
one shared method MTH1, MTH3 may be declared for both operations sequences MUT_AUTH, PUT_DAT1; or
two shared methods MTH1, MTH3 may be declared, one for each operations sequence; or
a plurality of shared methods MTH1, MTH3 may be declared for one operations sequence.

In a non-limitative embodiment, said ICC card is further adapted to store in a third context CTX3 of said rewritable non-volatile memory MEM1 said third application App3. A package PK3 comprises said third application App3 for the storing (function illustrated STOR3).

It is to be noted that said third context CTX3 is different from said first context CTX1 and from said second context CTX2.

Indeed, as the third application App3 imports said second shareable interface SI2, it is not possible to store said third application App3 in the first context CTX1.

It is to be noted that it is possible to store the third application App3 in the second context CTX2, but this solution will be equivalent to the first embodiment.

It is to be noted that each one of the shareable interfaces SI1 or SI2 is comprised in a package SI1_P and SI2_P for the storing. In non-limitative embodiment, said shareable interfaces SI1, SI2 are respectively stored within said first context CTX1 and second context CTX2.

In a non-limitative embodiment, the storing is performed upon reception of a second APDU loading command APDU_C4 comprising a package with said shareable interface SI1 or 312 and sent by a terminal T (function illustrated in FIG. 3 RX_APDU_C4).

It is to be noted that if the first application App1 has been loaded during a personalization phase PH, the shareable interface SI1 is also loaded during said personalization phase PH as it is part of said first application App1. The second application App2 and the third application App3, and therefore the second shareable interface SI2, are loaded after the personalization phase PH, upon update.

In a non-limitative embodiment, the first application App1 implements the at least one first shared method MTH1 for said mutual authentication MUT_AUTH (when said mutual authentication is applied) and for said loading PUT_DAT1, whereas the second application App2 implements at least one method MTH2 for the extraction GET_DAT1 of said first data Dat1 from said buffer G_BUFF and for the storing STOR2 of said first data Dat1 into the second context CTX2 of said rewritable non-volatile memory MEM1. Furthermore, the third application App3 implements the at least one second shared method MTH3, said implementation comprising a call to the at least first shared method MTH1 of said first application App1.

It is to be noted that the at least one method MTH2 is not a shared method. It is an unshared method.

In order to call the at least one first shared method MTH1 for the mutual authentication MUT_AUT (when applied) and for the loading PUT_DAT1 of the first application App1, in a non-limitative embodiment, the ICC card is adapted to request a first shareable interface object SIO1 related to said first application App1 (function illustrated RQ_SIO1).

In a non-(imitative embodiment, the request is performed via the getShareableInterfaceObject method which is available in the JavaCard™' Hence, the third application App3 will be able to get the object SIO1 which implements the first shared method(s) MTH1, by using the getShareableInterfaceObject method.

It is to be noted that before requesting an SIO1 from the first application App1, the ICC card is adapted to obtain the AID object associated to the first application App1, which is the first application identification AID1 stored in the second context CTX2 above described (function illustrated in FIG. 3 LK_AID1).

This AID1 will be a parameter of the getShareableInterfaceObject method so that the third application App3 will be able to get the first shared methods MTH1 of the right first application App1.

Then, the third application App3 calls the method implemented in the first application App1, i.e. the SIO1, MTH1.

In the same manner, in order to call the at least one second shared method MTH2 for the mutual authentication MUT_AUT (when applied) and for the loading PUT_DAT1 of the third application App3, in a non-limitative embodiment, the ICC card is adapted to request a second shareable interface object SIO3 related to said third application App3 (function illustrated RQ_SIO3).

In a non-(imitative embodiment, the request is performed via the getShareableInterfaceObject method which is available in the JavaCard™' Hence, the second application App2 will be able to get the object SIO3 which implements the second shared method(s) MTH3, by using the getShareableInterfaceObject method.

It is to be noted that before requesting an SIO3 from the third application App3, the ICC card is adapted to obtain the AID object associated to the third application App3, which is the third application identification AID3 stored in the second context CTX2 above described (function illustrated in FIG. 3 LK_AID3).

This AID3 will be a parameter of the getShareableInterfaceObject method so that so that the second application App2 will be able to get the second shared methods MTH3 of the right third application App3.

Then, the second application App2 calls the method implemented in the third application App3, i.e. the SIO3.MTH3.

In a non-limitative embodiment, the requests RQ_SIO1 and RQ_SIO3 are performed upon receiving the at least one APDU command APDU_C2.

For both embodiments above-described, it is to be noted that if the second application App2 is to be replaced later by another JavaCard™ application, of course, said second application App2 will be regarded as a first application App1 and will have the same structure than said first application App1 (shared method(s) MUT_AUTH, PUT_DAT1 etc.).

Hence, the integrated circuit card ICC above-described is adapted to carry out a method M for transferring first data Dat1 of a first JavaCard™ application App1 within said integrated circuit card ICC for use by a second JavaCard™ application App2 within said integrated circuit card ICC.

Figure 4:
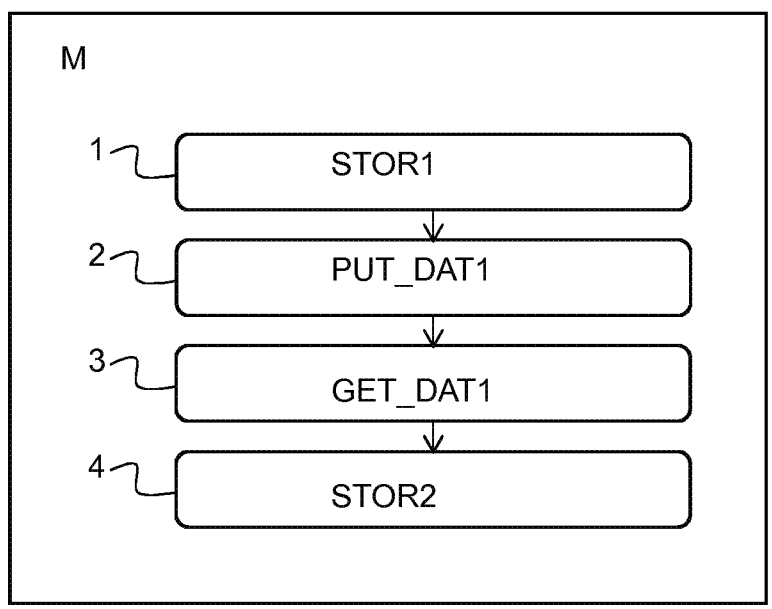
FIG. 4 is an organization chart illustrating a method which is carried out by the integrated circuit card of FIG. 1 according to a non-limitative embodiment.

Said method M is illustrated in FIG. 4. It comprises:
- storing a second JavaCard™ application App2 sent by a terminal T in a second context CTX2 of said rewritable non-volatile memory MEM1 (step illustrated STOR1);
- loading the first JavaCard™ application App1 first data Dat1 into said buffer G_BUFF (step illustrated PUT_DAT1);
- extracting said first JavaCard™ application App1 first data Dat1 from said buffer G_BUFF (step illustrated GET_DAT1); and
- storing said first data Dat1 into said second context CTX2 of said rewritable non-volatile memory MEM1 (step illustrated STOR2).

In a non-limitative embodiment, said method M further comprises executing a mutual authentication between said first JavaCard™ application App1 and said second JavaCard™ application App2.

In a non-limitative embodiment, said steps are performed by means of the virtual machine VM of the integrated circuit card ICC.

In a non-limitative embodiment, the virtual machine VM is further adapted to perform the further non-limitative steps described hereinafter in the first and second non-limitative embodiments.

Figure 5:
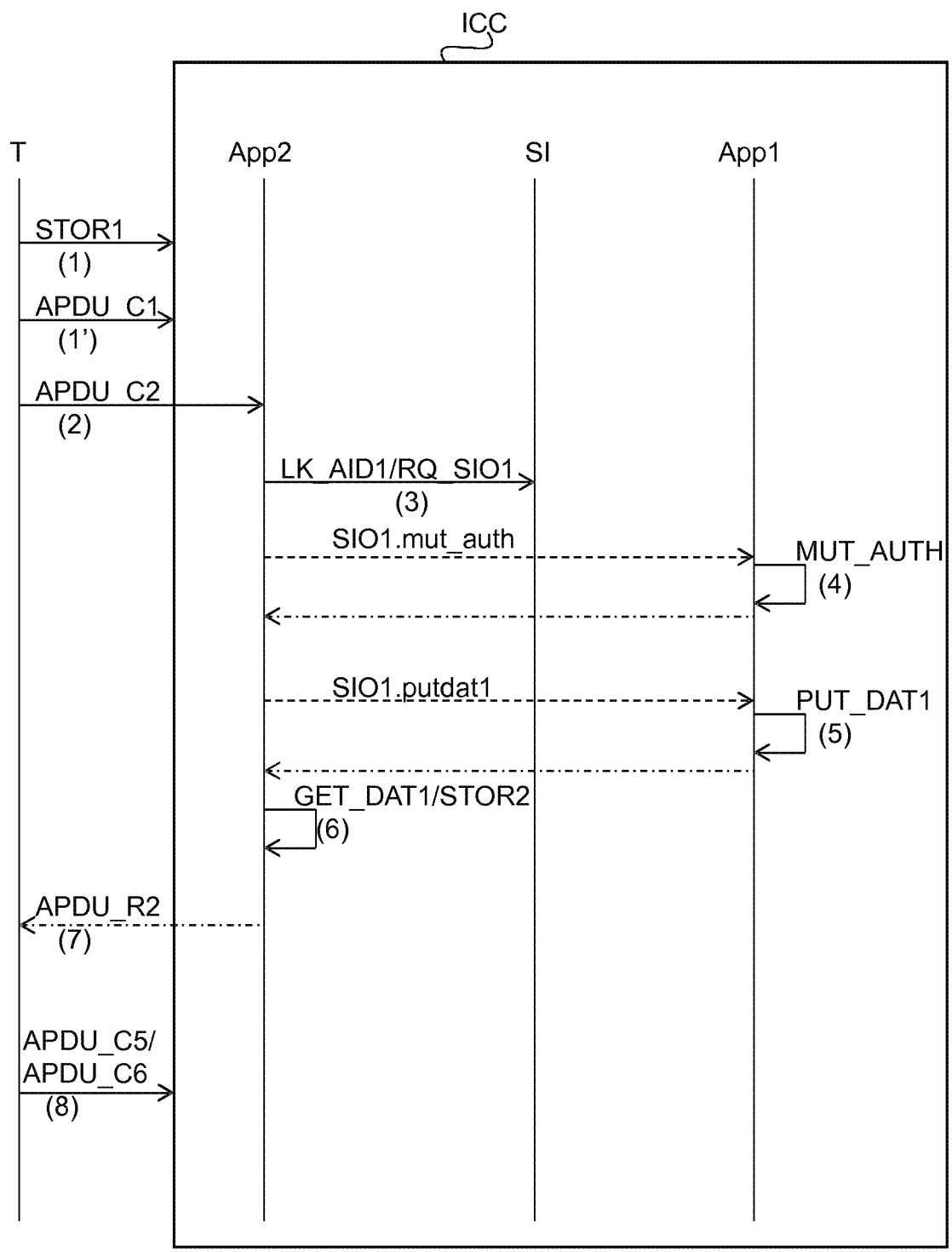
FIG. 5 is a first sequence diagram of the method of FIG. 4 which is carried out by the integrated circuit card of FIG. 2 and which comprises further non-limitative steps according to a first non-limitative embodiment.
Figure 6:
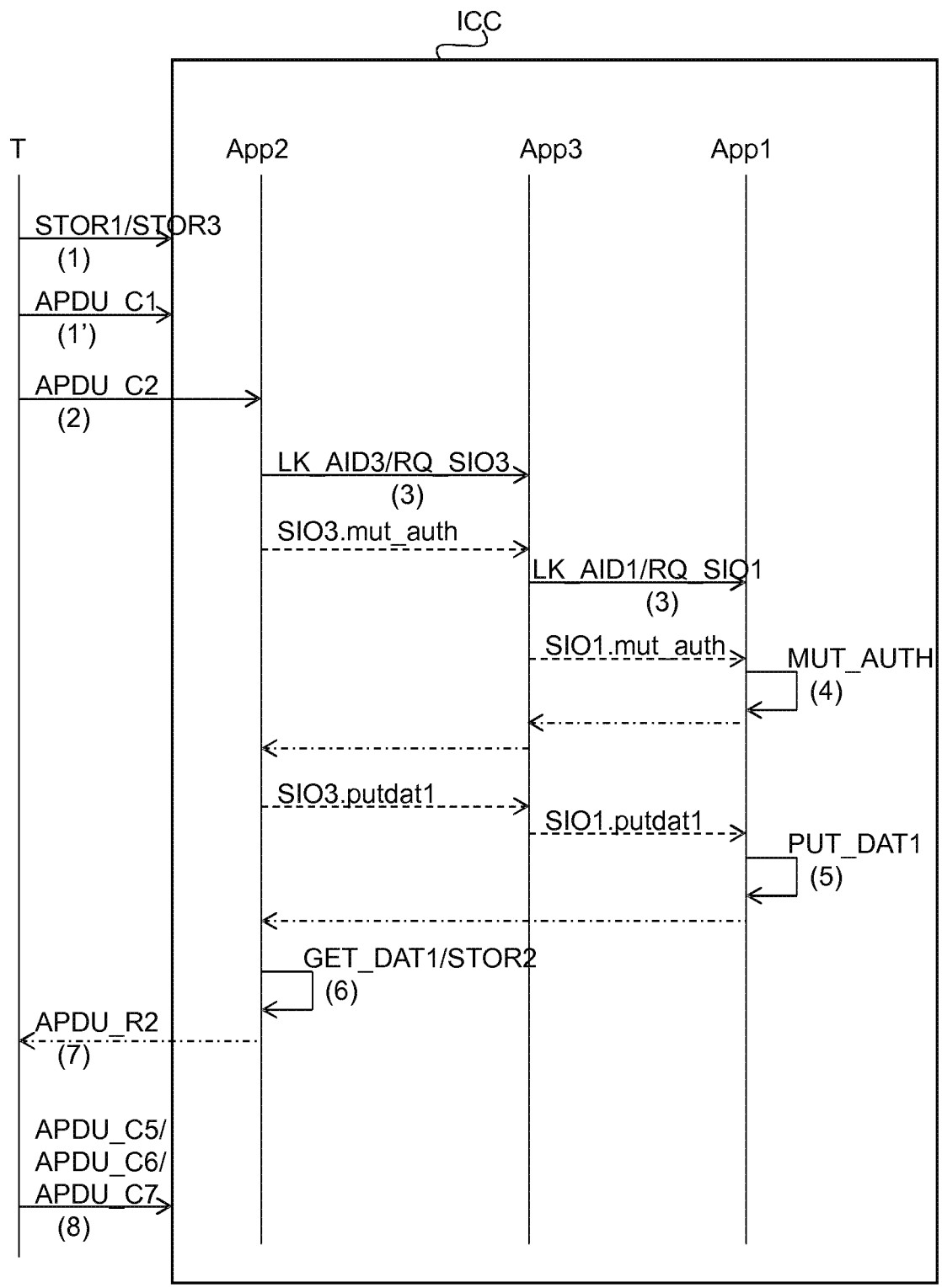
FIG. 6 is a second sequence diagram of the method of FIG. 4 which is carried out by the integrated circuit card of FIG. 3 and which comprises further non-limitative steps according to a second non-limitative embodiment.

Said method is illustrated according to a first non-limitative embodiment in FIG. 5 and according to a second non-limitative embodiment in FIG. 6. In these non-limitative embodiments, said mutual authentication MUT_AUTH is applied.

First Non-Limitative Embodiment

The first non-limitative embodiment of the ICC card above-described carries out said first non-limitative embodiment.

In the non-limitative example illustrated, there are two shared methods declared in the shareable interface SI:
- SIO1.mut_auth for the mutual authentication; and
- SIO1.putdat1 for the loading of the first data Dat1 in the buffer G_BUFF.

The different steps are described in detailed hereinafter.

It is to be noted that in a non-limitative embodiment, the method M comprises an initial step (not illustrated) of establishing a secure channel SCh between said integrated circuit card ICC and said terminal T. The ICC card will securely receive any APDU command APDU_C from the terminal T.

In step 1), the ICC card stores a second application App2 in a second context CTX2 in said rewritable non-volatile memory MEM1 sent by a terminal T.

A second application identification AID2 is associated with said second application App2. It is different from the first application identification AID1 so that both JavaCard™ applications App1 and App2 may be differentiated. It is to be noted that after the loading of said second application App2, said new application App2 is selected by the terminal T via its second application identification AID2 so that the subsequent APDU commands are sent to said new application App2.

The selection (step 1') is performed by means of an APDU select command (illustrated APDU_C1) comprising said second application identification AID2 as a parameter.

It is to be noted that here, the selected application App2 is not the running application for the moment. The selection permits the second application App2 to receive the APDU commands APDU_C sent by the terminal T.

In step 2), the ICC card receives an APDU command APDU_C2 from said terminal T to trigger said mutual authentication MUT_AUTH, said loading PUT_DAT1, said extraction GET_DAT1, and said storing STOR2 of the first data Dat1 in said second context CTX2.

As the second application App2 has been selected, the command APDU_C2 is received by the second application App2.

In step 3), the ICC card requests (for the second application App2) a first shareable interface object SIO1 related to said first application App1 (via the getShareableInterfaceObject method).

The second application App2 may now access to the first shared method(s) MTH1.

The second application App2 calls the SIO1.mut_auth method which permits to execute the mutual authentication implemented in the first application App1, said SIO1.mut_auth method comprising the operation sequences of the symmetric or asymmetric authentication process.

Upon said calling, in step 4), the ICC card executes a mutual authentication between said first application App1 and said second application App2.

As the secret key Sk, or the pair of public key Kpu-private key Kpv is stored in each context CTX1 and CTX2 of respectively said first and second JavaCard™ applications, said applications will be able to perform the mutual authentication with said keys Sk or Kpu-Kpv.

The transfer of data between the two applications will now be performed in a secure way, because said mutual authentication ensures that the new application App2 is a genuine one, and because the data may be enciphered by the session keys generated by the mutual authentication process.

If said mutual authentication succeeded, the old application App1 will allow the new application App2 to get some data. Otherwise, the old application App1 will reject any data requested by disabling the first shared methods.

Hence, subsequently, the second application App2 calls the SIO1.putdat1 method which permits to execute the loading of the first data Dat1 into said buffer G_BUFF.

It is to be noted that every call to this method will return a first data Dat1 or a collection of first data Dat1 in the buffer G_BUFF. The input parameters of this method SIO1.putdat1 will be the reference to the buffer G_BUFF and a byte of first data identifier.

Said first data identifier permits to select which first data Dat1 will be transferred.

Upon said calling, in step 5), the ICC card loads the first application's App1 first data Dat1 into said buffer G_BUFF.

Hence, the first data Dat1 selected in the first context CTX1 are copied in said buffer G_BUFF.

Then, in step 6), the ICC card extracts said first application App1 first data Dat1 from said buffer G_BUFF and stores said first data Dat1 into the second context CTX2 of said rewritable non-volatile memory MEM1. The first data Dat1 are now available by the second application App2.

It is to be noted that during all the processing of the method M, there is a duplication of said first data Dat1 of the first context CTX1 in said second context CTX2 to ensure that the ICC card will remain at the same state. Hence, the current running application (whether it is App1 or App2) is still stable, in case any disruption happens during the transfer process M.

It is to be noted that the data transfer is transparent from the terminal's T point of view: no first data Dat1 are transmitted to the external world. The terminal T just have to wait for the first APDU response APDU_R2 from the ICC card.

In step 7), the ICC card sends an APDU response APDU_R2 to the terminal T to tell that the transfer of the first data Dat1 is finished, and has been correctly executed.

In step 8), the ICC card selects the second application App2 as the running application and delete said first application App1 from said rewritable non-volatile memory MEM1.

The selection and delete are performed respectively with the second application identifier AID2 and first application identifier AID1.

The ICC card is adapted to receive:
an APDU select command APDU_C5 from said terminal T with the second AID2 as a parameter (function illustrated in FIG. 2 RX_APDU_C5); and
an APDU delete command APDU_C6 from said terminal T with the first AID1 as a parameter (function illustrated in FIG. 3 RX_APDU_C6).

Upon finishing the transfer of the first data Dat1 and the updating of the old application App1 with the new application App2, only the shareable interface package SI_P and the second application package PK2 will remain in said ICC card.

Second Non-Limitative Embodiment

The second non-limitative embodiment of the ICC card above-described carries out said second non-limitative embodiment.

In the non-limitative example illustrated, there are two shared methods declared in the first shareable interface SI1:
SIO1.mut_auth for the mutual authentication; and
SIO1.putdat1 for the loading of the first data Dat1 in the buffer G_BUFF.

In the non-limitative example illustrated, there are two shared methods declared in the second shareable interface SI2:
SIO3.mut_auth for the mutual authentication; and
SIO3.putdat1 for the loading of the first data Dat1 in the buffer G_BUFF.

In step 1), the ICC card stores a second application App2 in a second context CTX2 in said rewritable non-volatile memory MEM1 sent by a terminal T.

Said second application's storing is the same than step 1 described in the first non-limitative embodiment of the method M.

Furthermore, said step comprises the storing of the third application App3. It is to be noted that said intermediary application App3 is to be stored last, since it will import two different definitions of shared interfaces, one SI1 from the old application App1, and one SI2 from the new application App2.

Step 2) is the same than the one described in the first non-limitative embodiment of the method M.

In step 3), the ICC card requests (getShareableInterfaceObject method):
for the second application App2 a second shareable interface object SIO3 related to said third application App3.
for the third application App3 a first shareable interface object SIO1 related to said first application App1.

The second application App2 may now access to the second shared method(s) MTH3.

The third application App3 may now access to the first shared method(s) MTH1.

The second application App2 calls the SIO3.mut_auth method which permits to execute the mutual authentication implemented in the third application App3.

As said SIO3.mut_auth method calls the SIO1.mut_auth, the third application App3 calls the SIO1.mut_auth method which permits to execute the mutual authentication implemented in the first application App1, said SIO1.mut_auth method comprising the operation sequences for the symmetric or asymmetric authentication process.

Upon said calling (of SIO1.mut_auth), in step 4), the ICC card executes a mutual authentication between said first application App1 and said second application App2.

As the secret key Sk, or the pair of public key Kpu-private key Kpv is stored in each context CTX1 and CTX2 of respectively said first and second JavaCard™ applications, said applications will be able to perform the mutual authentication with said keys Sk or Kpu-Kpv.

The transfer of data between the two applications will now be performed in a secure way, because said mutual authentication ensures that the new application App2 is a genuine one, and because the data may be enciphered by the session keys generated by the mutual authentication process.

If said mutual authentication succeeded, the old application App1 will allow the new application App2 to get some data by enabling the first shared methods and the intermediary application App3 will enable the second shared methods. Otherwise, the old application will reject any data requested by disabling the first shared methods and the intermediary application App3 will disable the second shared methods.

Hence, subsequently, the second application App2 calls the SIO3.putdat1 method which will calls the SIO1.putdat1 which permits to execute the loading of the first data Dat1 into said buffer G_BUFF.

It is to be noted that every call to this method will return a first data Dat1 or a collection of first data Dat1 in the buffer G_BUFF. The input parameters of this method SIO1.putdat1 will be the reference to the buffer G_BUFF and a byte of first data identifier.

Said first data identifier permits to select which first data Dat1 will be transferred.

Step 5), 6) and 7) are the same steps than those described for the first embodiment above-described.

In step 8), the ICC card selects the second application App2 as the running application, delete said first application App1 from said rewritable non-volatile memory MEM1, and delete said third application App3 from said rewritable non-volatile memory MEM1.

The selection and delete are performed respectively with the second application identifier AID2, and with the first and third application identifiers AID1, AID3.

The ICC card is adapted to receive:
an APDU select command APDU_C5 from said terminal T with the second AID2 as a parameter (function illustrated in FIG. 3 RX_APDU_C5); and
an APDU delete command APDU_C6 from said terminal T with the first AID1 as a parameter (function illustrated in FIG. 3 RX_APDU_C6).
an APDU delete command APDU_C7 from said terminal T with the third AID3 as a parameter (function illustrated in FIG. 3 RX_APDU_C7).

It is to be noted that the intermediary application App3 needs to be deleted first and the old application App1 secondly, otherwise said old application App1 can't be deleted.

Upon finishing the transfer of the first data Dat1 and the updating of the old application App1 with the new application App2, only the second application package PK2 will remain in said ICC card.

It is to be understood that the present invention is not limited to the aforementioned embodiments and variations and modifications may be made without departing from the scope of the invention. In the respect, the following remarks are made.

Hence, other virtual machines VM than a JVM for an ICC card may be used. Hence, in a non-limitative embodiment, when the second application App2 has acquired the first data Dat1, some sanity checks may be performed to ensure the correctness of the second application App2. Then, if the second application App2 passed these sanity checks, it is selected as the running application. Hence, in a non-limitative embodiment, the first data Dat1 are loaded in said buffer G_BUFF with a CRC (Cyclic Redundancy Check) for integrity check. Hence, before storing said first data Dat1 in said second context CTX2, the CRC will be checked.

Hence, in a non-limitative embodiment, a plurality of APDU command may be used to trigger respectively the following operation sequences: the selection of the new application App2 just after its storing into said second context CTX2, the authentication MUT_AUTH, the loading PUT_DAT1. One APDU command is therefore associated to one operation sequences.

Hence, in a non-limitative embodiment, a plurality of shared methods may be used for executing the mutual authentication MUT_AUTH, such as in non-limitative examples a shared method for the transmission of the challenge to the second application App2, a shared method for the encryption of said challenge by said second application App2, a shared method for the sending back of the obtained cryptogram, and another shared method for the verification of said cryptogram by the first application App1.

Hence, in another non-limitative embodiment, the second shareable interface SI2 may be defined within said third JavaCard™ application App3 and imported within said second JavaCard™ application App2. Contrary to the embodiment described before, in this embodiment, the third JavaCard™ application App3 will not be able to be deleted since it comprises the second shareable interface SI2 definition which is imported by the second JavaCard™ application App2.

The embodiments are also intended to cover computers programmed to perform said steps of the above-described method.

One or a plurality of computer program products PG as illustrated in FIG. 1 can be contained in the ICC card. A computer program product PG comprises a set of instructions. Thus, said set of instructions contained, for example, in an ICC card memory, may cause the ICC card (an more particularly in a non-limitative embodiment the virtual machine VM) to carry out the different steps of the method M.

Hence, some embodiments of the invention may comprise one or a plurality of the following advantages:
  it is easy to implement;
  it permits to update an ICC card with a new application App2 which will use data Dat1 that were previously used and possibly updated by an old application App1;
  it permits to add additional features or fix bugs in the ICC card by replacing the old application App1 with the new application App2 without losing the data Dat1 of the old application App1;
  from the terminal point of view which cooperates with the ICC card, the only major change is just the AID change to select the new application App2;
  it permits to delete the intermediary application App3 and the old application App1 and therefore to have after update, the new application App2 stand alone in the ICC card.

The invention claimed is:

1. An integrated circuit card comprising a rewritable non-volatile memory and a buffer, said rewritable non-volatile memory comprising a first context where a first JavaCard™ application comprising first data is stored, wherein said integrated circuit card is adapted to:
  store in a second context of said rewritable non-volatile memory a second JavaCard™ application sent by a terminal;
  wherein said rewritable non-volatile memory further comprises a shareable interface which is imported within said first JavaCard™ application and within said second JavaCard™ application, said shareable interface defining at least one shared method for said loading;
  the second JavaCard™ application being adapted to receive at least one APDU command from said terminal to trigger the following steps through the integrated circuit card:
  requesting the shareable interface related to said first application to access to the shared method;
  calling the shared method for a loading and loading the first JavaCard™ application first data into said buffer;
  extract said first JavaCard™ application first data from said buffer and store said first data into said second context.

2. The integrated circuit card according to claim 1, wherein said integrated circuit card is further adapted to:
  send to said terminal a first APDU response indicating that said at least one APDU command has been executed correctly.

3. The integrated circuit card according to claim 1, wherein said integrated circuit card is further adapted to:
  select the second JavaCard™ application as the running application; and
  delete said first JavaCard™ application from said rewritable non-volatile memory (MEM1).

4. The integrated circuit card according to claim 1, wherein said integrated circuit card is further adapted to execute a mutual authentication between said first JavaCard™ application and said second JavaCard™ application.

5. The integrated circuit card according to claim 4, wherein said integrated circuit card is further adapted to store in said second context and in said first context a secret key or a pair of private and public keys for the mutual authentication.

6. The integrated circuit card according to claim 1, wherein said rewritable non-volatile memory further comprises:
  a third JavaCard™ application;
  a first shareable interface which is defined within said first JavaCard™ application and which is imported within said third JavaCard™ application, said first shareable interface comprising the declaration of at least one first shared method for said loading;
  a second shareable interface which is defined within said second JavaCard™ application and which is imported within said third JavaCard™ application, said second shareable interface comprising the declaration of at least one second shared method for said loading.

7. The integrated circuit card according to claim 6, wherein the first JavaCard™ application implements the at least one first shared method for said loading, and the second JavaCard™ application implements at least one method for said extraction and for said storing of said first data into said buffer.

8. The integrated circuit card according to claim 1, wherein said integrated circuit card is a secure element.

9. The integrated circuit card according to claim 2, wherein said integrated circuit card is further adapted to:
  select the second JavaCard™ application as the running application; and
  delete said first JavaCard™ application from said rewritable non-volatile memory.

10. The integrated circuit card according to claim 2, wherein said integrated circuit card is further adapted to execute a mutual authentication between said first JavaCard™ application and said second JavaCard™ application.

11. A method for transferring first data of a first JavaCard™ application within an integrated circuit card for use by a second JavaCard™ application within said integrated circuit card, said integrated circuit card comprising a rewritable non-volatile memory and a buffer, said first JavaCard™ application being stored in a first context in said rewritable non-volatile memory, wherein said method comprising:
  storing a second JavaCard™ application sent by a terminal in a second context of said rewritable non-volatile memory;
  wherein said rewritable non-volatile memory further comprises a shareable interface which is imported within said first JavaCard™ application and within said second JavaCard™ application, said shareable interface defining at least one shared method for a loading,
  the second JavaCard™ application being adapted to receive at least one APDU command from said terminal to trigger the following steps through the Integrated circuit card:
  requesting the shareable interface related to said first application to access to the shared method,
  calling the shared method for a loading and loading the first JavaCard™ application first data into said buffer;
  extracting said first JavaCard™ application first data from said buffer and storing said first data into said second context.

12. The method according to claim 11, wherein said method further comprises:
  selecting the second JavaCard™ application as the running application; and
  deleting said first JavaCard™ application from said rewritable non-volatile memory.

13. The method according to claim 11, wherein said method further comprises executing a mutual authentication between said first JavaCard™ application and said second JavaCard™ application.

14. The method according to claim 13, wherein said method further comprises storing in said second context and in said first context a secret key or a pair of private and public keys for the mutual authentication.

15. The method according to claim 11, wherein for said loading:
  at least one first shared method is defined within a first shareable interface, said first shareable interface being defined within said first JavaCard™ application and being imported within said third JavaCard™ application;
  at least one second shared method is defined within a second shareable interface, said second shareable interface being defined within said second JavaCard™ application and being imported within said third JavaCard™ application.

16. The method according to claim 12, wherein said method further comprises executing a mutual authentication between said first JavaCard™ application and said second JavaCard™ application.

17. The method according to claim 11, wherein said integrated circuit card (ICC) is further adapted to:
  send to said terminal a first APDU response indicating that said at least one APDU command has been executed correctly.

* * * * *